United States Patent Office 2,708,652
Patented May 17, 1955

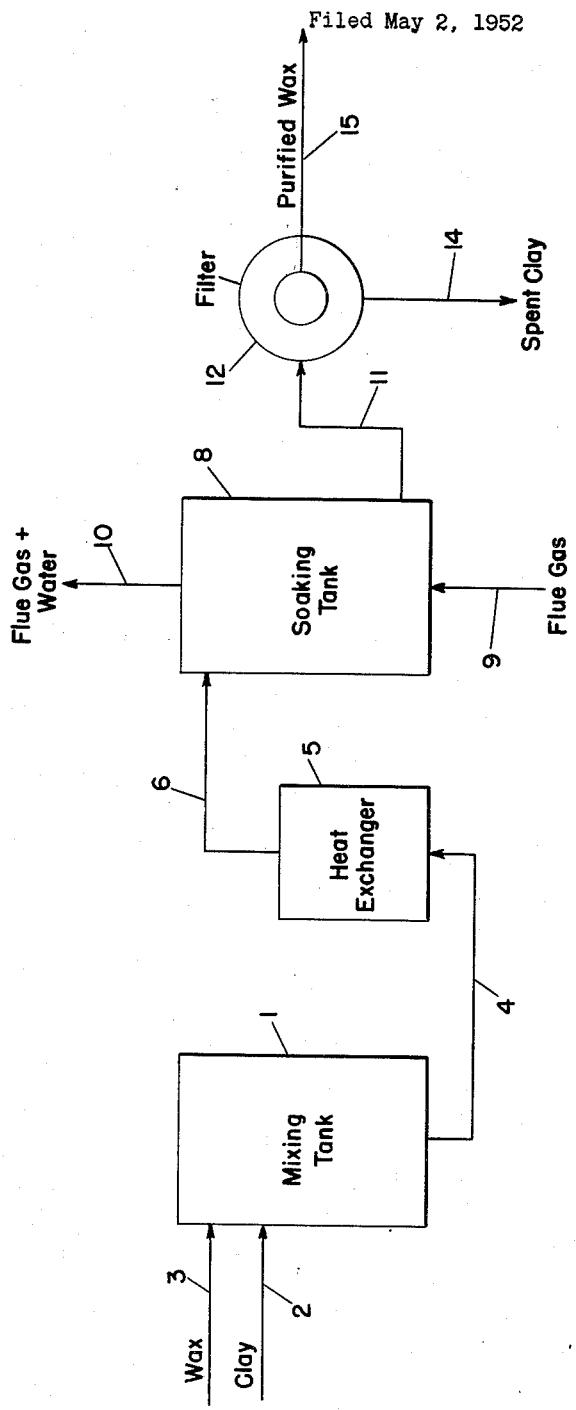

2,708,652

WAX REFINING

William A. Ackerman, Havertown, Pa., assignor to Sun Oil Company, Philadelphia, Pa., a corporation of New Jersey Application May 2, 1952, Serial No. 285,710

5 Claims. (Cl. 196—21)

This invention relates to a process for refining wax. More specifically, the present invention relates to a process for decolorizing and deodorizing waxes.

Petroleum waxes are generally obtained by separation thereof from lubricating oil fractions obtained in petroleum refining, usually by chilling oil fractions and separating the precipitated wax. Various processes for purifying the separated wax, such as sweating or crystallization from solvents to de-oil the wax, have been described. In such processes the wax charge frequently has a foul odor which is carried over into the final product, the product also being colored, usually from light yellow to dark brown. Improvements in odor and color have heretofore been obtained by treatment of the wax with solid adsorptive materials such as bauxite, fuller's earth, other clays, and other active adsorbents. In these purification processes it has heretofore frequently been necessary to employ excessive quantities of adsorptive materials in order to achieve the desired results, or to employ an additional step or steps such as treating the wax with aluminum chloride or sulfuric acid, and subsequently with an adsorbent.

An object of the present invention is to provide a rapid and commercially feasible process for decolorizing and deodorizing waxes.

A further object is to provide a process wherein the quantity of solid adsorbent required for the decolorization and deodorization of waxes is substantially reduced.

Another object is to prepare a wax product of good color and odor characteristics.

Other objects appear hereinafter.

It has now been found that by continuously passing an inert gas through a mixture of molten wax and a solid adsorbent, the wax is rapidly decolorized and deodorized. It has been further found that by such operation the quantity of adsorbent required to refine the wax to a given color or odor level is substantially reduced, and that a wax product of good color and odor characteristics is prepared.

The present invention may be more readily understood by reference to the accompanying drawing which is a flow diagram illustrating the present process. Clay, used to illustrate suitable solid adsorptive materials, and molten wax are introduced through lines 2 and 3, respectively, into mixing tank 1, which is provided with agitating means (not shown). The resulting mixture of clay and molten wax is passed through line 4 to heat exchanger 5, wherein the temperature is adjusted to the desired value. From heat exchanger 5, the mixture passes through line 6 to soaking tank 8, preferably provided with agitation means (not shown). Flue gas, used to illustrate various inert gases which may be employed, is introduced into or near the bottom of tank 8 through line 9. The flue gas passes up through the admixture of molten wax and clay and is removed from the process through line 10. Soaking tank 8 is preferably a vertically elongated vessel so that the flue gas will pass through a substantial body of the wax-clay mixture, and also is preferably an enclosed vessel, vented as shown by 10, to provide for safe operation. The volume of soaking tank 8 and through-put are regulated to obtain the desired residence time of the wax-clay mixture therein. If desirable or necessary, heating means (not shown) may be applied to soaking tank 8 to maintain the desired temperature. From soaking tank 8 the mixture of wax and clay passes through line 11 to filter 12, where clay is separated and removed from the process through line 14. Purified wax is recovered through line 15. If necessary or desirable, the purified wax may be subjected to additional operations such as heating to remove any remaining traces of moisture or volatile impurities.

Valves, pumps, heat exchangers, control means, and the like, the location and operation of which will be apparent to those skilled in the art, have been omitted from the diagram.

As demonstrated by the following examples, operating in accordance with the process of the present invention substantially decreases the quantity of solid adsorbent required to decolorize and deodorize a given wax stock. The reason for the enhanced results is not known with certainty. It is believed that the continuous introduction of flue gas into a mixture of molten wax and clay causes continuous stripping of water from clay, the water being removed from the process with the flue gas, and that this continuous removal of water from clay while in contact with molten wax increases the activity of the clay for purification of the contacting wax. This increase in activity permits a large reduction in the amount of clay required to reach a given purity with a given wax charge stock.

Waxes which may be purified in accordance with the present process are the petroleum waxes including paraffin and microcrystalline waxes ranging in melting point from about 100° F. to 200° F. The process has been found particularly effective with paraffin waxes which have become partially oxidized in storage.

Various solid adsorbents which may be employed in the present process are the adsorbent clays, such as fuller's earth, bauxite, bentonite, synthetic aluminum silicate, and the like. It is essential to the successful operation of the process to employ a clay having a free moisture content of at least 2% by weight, and preferably from 5% to 20% or more by weight. By "free moisture content" is meant moisture loosely held by physical bonds which is easily removed by heating the adsorbent to about 250° F. for 2 hours. Clays also normally have from about 5% to 12% by weight of "combined moisture," which is moisture held by bonds stronger than mere physical bonds, and which is removed by heating the clay at 1800° F. for about 2 hours. Clays commercially available normally have moisture contents within the stated ranges, and hence are suitable for use in the present process. The quantity of adsorbent to employ will vary according to the wax treated, the adsorbent employed, the residence time in the soaking tank and the temperature within the soaking tank. In general, the quantity of adsorbent will be from 5 to 60 lbs. per barrel of wax, and usually will be within the range of from 10 to 40 lbs. per barrel of wax. The residence time, i. e., the time of contact of wax and adsorbent, will vary from about 0.5 to 3 hours. The temperature during contacting of wax and adsorbent will vary according to the other variables and type of wax. In general, the temperature of contacting will be in the range of from about 150° F. to 350° F.

Flue gas has been used to illustrate various inert gases which may be employed to strip the admixture of molten wax and adsorbent, and is preferred because of its availability and non-explosive characteristics. By "inert gas," as used herein, is meant a gas which does not react with, or cause reaction, when contacted with a mixture of molten wax and solid adsorbent, and which does not impart a substantial quantity of moisture to the mixture. Other gases which may be substituted for flue gas, in whole or in part, include nitrogen, carbon dioxide and air. In general, the moisture content of such inert gases is sufficiently low, below about 15%, so that it is unnecessary to employ a drying step, but if necessary or desirable, drying of the inert gas prior to contacting with the wax-clay mixture may be performed. Steam is not suitable for use as the inert gas. The quantity of gas to employ will vary according to other variables, including the quantity and moisture content of the clay and temperature of contacting, but generally will be within the range of from 2 to 50 cubic feet per pound of clay employed.

The following examples illustrate the process of the present invention in which Saybolt color was determined by ASTM method D 156-38:

Example 1

A paraffin wax having a foul odor and yellowish brown color, too dark to measure with the method employed, was admixed with 55 pounds of clay per barrel of wax. The clay had a free moisture content of about 10%. The admixture passed to a soaking tank wherein contact was continued at 250° F. for 1.5 hours under an atmosphere of flue gas. Intimate admixing in the soaking tank was obtained by continuous mechanical agitation. Spent clay was separated by filtration. The separated wax was steam stripped and again filtered to remove clay fines. The product retained the foul odor of the charge stock, and was only partially decolorized, the product being yellow (+21 Saybolt color) and unacceptable commercially.

The above process was repeated with the same wax stock and clay except that, instead of maintaining the soaking tank under an atomsphere of flue gas, flue gas was passed through the mixture of wax and clay, and 25 pounds, instead of 55 pounds, of clay per barrel of wax was employed. The flue gas was introduced into the bottom of the soaking tank in the amount of 4 cubic feet per pound of clay. The resulting product was essentially colorless (+30 Saybolt color), odorless and completely acceptable commercially.

Example 2

The procedure of the present process was repeated using clay which had been preheated to remove substantially all of its free moisture content. It was found that such preheating reduced the efficiency of the clay for purifying wax, and hence such operation is not comparable to the passing of an inert gas through the wax-clay mixture to remove moisture from clay during contact with molten wax.

Example 3

The wax charge of Example 1 was refined in a continuous process using 25 pounds of clay per barrel of wax. The temperature of the wax-clay admixture was maintained at about 250° F. Flue gas at a rate of 4 cubic feet per pound of clay was passed through the wax-clay admixture over the 1.5 hour contacting period. (The clay had a free moisture content of about 10%.) The clay and wax were separated by filtration and the separated wax subjected to steam stripping. The product obtained was essentially colorless (+30 Saybolt color), odorless and completely commercially acceptable.

Introduction of flue gas was discontinued. The resulting product rapidly assumed the foul odor and yellow color of the charge stock, and was commercially unacceptable.

Resumption of flue gas introduction resulted in a commercially acceptable product which was essentially colorless and odorless, as above described.

Example 4

A paraffin wax having a foul odor and yellowish brown color was agitated with 30 pounds of clay, having a free moisture content of about 10%, per barrel of wax at 275° F. for 1.5 hours, the contacting being formed in a vented substantially confined vertically elongated soaking vessel. The wax product, after separation from clay, retained the foul odor of the charge stock and the color improvement was poor. The wax was not commercially acceptable.

The run was repeated using the same wax charge stock and conditions except that about 10 cubic feet of nitrogen per pound of clay employed was bubbled through the mixture of wax and clay over the 1.5 hour contacting period. On separation from clay, the wax product was substantially odorless and colorless (+30 Saybolt) and was acceptable commercially.

Example 5

A paraffin wax having a foul odor and yellowish brown color was agitated with 20 pounds of clay, having a free moisture content of about 10%, per barrel of wax at 250° F. for 1.5 hours. About 10 cubic feet of air per pound of clay employed was bubbled through the mixture of wax and clay over the 1.5 hour contacting period. The wax product, after separation from clay, was substantially odorless and colorless (+30 Saybolt) and was acceptable commercially.

Using the same wax charge stock and conditions except that steam was substituted for air, the wax product retained the foul odor of the charge stock and color improvement was poor (+26 Saybolt). The wax was not commercially acceptable.

The foregoing examples illustrate embodiments of the process of the present invention. When other materials or conditions within the limitations herein described are employed, substantially the same or similar results are obtained. Thus, adsorptive clays having a free moisture content of from 2% to 20% by weight or more give good results, it being understood that such clays also have from about 5% to 12% by weight of combined moisture, as described above. Also, the use of other inert gases, such as carbon dioxide, gives good results. The present process is advantageously operated as a continuous process, but semi-continuous and batch operation give good results.

The invention claimed is:

1. Process of deodorizing and decolorizing wax which comprises forming an admixture of molten wax and adsorptive clay having a free moisture content of at least 2% by weight, said admixture containing from 5 to 60 pounds of said clay per barrel of wax, passing from 2 to 50 cubic feet of an inert gas per pound of clay employed through a substantial body of said admixture over a period of from 0.5 to 3 hours, whereby said inert gas strips moisture from said clay, continuously removing said inert gas admixed with moisture from said admixture, and separating purified wax from clay.

2. Process according to claim 1 wherein said inert gas is flue gas.

3. Process according to claim 1 wherein said inert gas is nitrogen.

4. Process according to claim 1 wherein said inert gas is carbon dioxide.

5. Process according to claim 1 wherein said inert gas is air.

References Cited in the file of this patent

UNITED STATES PATENTS

| | | |
|---|---|---|
| 2,329,785 | Pool | Sept. 21, 1943 |
| 2,585,895 | Dougherty et al. | Feb. 12, 1952 |
| 2,596,942 | Robertson et al. | May 13, 1952 |